(12) United States Patent
Jodet et al.

(10) Patent No.: US 11,554,534 B2
(45) Date of Patent: Jan. 17, 2023

(54) METHOD FOR IN SITU ADDITIVE MANUFACTURING OF A COATING ON A TURBOMACHINE CASING

(71) Applicant: SAFRAN AIRCRAFT ENGINES, Paris (FR)

(72) Inventors: Norman Bruno Andre Jodet, Moissy-Cramayel (FR); Jeremy Paul Francisco Gonzalez, Moissy-Cramayel (FR); Jacky Novi Mardjono, Moissy-Cramayel (FR); Arnaud Dubourg, Montreal (CA); Edith-Roland Fotsing, Montreal (CA); Annie Ross, Montreal (CA); Daniel Therriault, Montreal (CA)

(73) Assignee: SAFRAN AIRCRAFT ENGINES, Paris (FR)

( * ) Notice: Subject to any disclaimer, the term of this patent is extended or adjusted under 35 U.S.C. 154(b) by 143 days.

(21) Appl. No.: 16/770,364

(22) PCT Filed: Dec. 6, 2018

(86) PCT No.: PCT/FR2018/053130
§ 371 (c)(1),
(2) Date: Jun. 5, 2020

(87) PCT Pub. No.: WO2019/110936
PCT Pub. Date: Jun. 13, 2019

(65) Prior Publication Data
US 2020/0376743 A1 Dec. 3, 2020

(30) Foreign Application Priority Data

Dec. 6, 2017 (CA) ................................ CA 2988229
Dec. 6, 2017 (FR) ..................................... 17 61727

(51) Int. Cl.
*B29C 64/118* (2017.01)
*B33Y 10/00* (2015.01)
(Continued)

(52) U.S. Cl.
CPC .......... *B29C 64/118* (2017.08); *B29C 70/326* (2013.01); *B33Y 10/00* (2014.12);
(Continued)

(58) Field of Classification Search
CPC ... B29C 64/118; B29C 70/326; B29C 64/106; B29C 64/112; B29C 64/124;
(Continued)

(56) References Cited

U.S. PATENT DOCUMENTS

2012/0228051 A1* 9/2012 Drevon ................... F02K 1/827
181/222
2015/0030803 A1* 1/2015 Butler ....................... B32B 5/26
264/258

(Continued)

FOREIGN PATENT DOCUMENTS

| GB | 2484350 A | * | 4/2012 | ........... B29C 70/205 |
|---|---|---|---|---|
| GB | 2484350 A | | 4/2012 | |
| WO | WO 2011/061430 A1 | | 5/2011 | |

OTHER PUBLICATIONS

International Search Report dated Mar. 6, 2019 in PCT/FR2018/053130 filed on Dec. 6, 2018, 2 pages.
(Continued)

*Primary Examiner* — Seyed Masoud Malekzadeh
(74) *Attorney, Agent, or Firm* — Oblon, McClelland, Maier & Neustadt, L.L.P.

(57) ABSTRACT

A method of a coating by additive manufacturing on a turbomachine casing includes depositing on an internal surface of the turbomachine casing a filament of an abradable material to create a three-dimensional scaffold of fila- (Continued)

ments. A filamentary material deposition system is positioned from the internal surface of the casing; a first layer of the coating is deposited over 360'; a rotation of the filamentary material deposition system is carried out by a first predetermined angle and the filamentary material deposition system is positioned from the deposited layer; a second layer of coating is deposited on the first coating layer, on a sector of the casing; a displacement is carried out corresponding to the first sector already covered, then for the following sectors until 360° is covered; and after having carried out a rotation of the filamentary material deposition system.

12 Claims, 6 Drawing Sheets

(51) Int. Cl.
    *B33Y 30/00*     (2015.01)
    *B29C 70/32*     (2006.01)
    *B29K 63/00*     (2006.01)
    *B29K 105/24*     (2006.01)
    *B29L 31/00*     (2006.01)

(52) U.S. Cl.
    CPC .......... *B33Y 30/00* (2014.12); *B29K 2063/00* (2013.01); *B29K 2105/24* (2013.01); *B29L 2031/748* (2013.01)

(58) Field of Classification Search
    CPC ..... B29C 64/129; B29C 64/135; B29C 70/38; B29C 70/382; B29C 70/384; B29C 70/386; B29C 70/388; B33Y 10/00; B33Y 30/00; B29K 2063/00; B29K 2105/24; B29L 2031/748
    USPC .......................................................... 264/259
    See application file for complete search history.

(56) References Cited

U.S. PATENT DOCUMENTS

| | | | |
|---|---|---|---|
| 2016/0287756 A1* | 10/2016 | Lewis | A61L 27/507 |
| 2016/0346997 A1* | 12/2016 | Lewis | B29C 70/06 |
| 2016/0354896 A1* | 12/2016 | Lewis | B32B 5/12 |
| 2017/0072631 A1* | 3/2017 | Gallucci | G01N 33/442 |
| 2017/0165908 A1* | 6/2017 | Pattinson | B33Y 80/00 |
| 2018/0110901 A1* | 4/2018 | Lewis | B29C 64/106 |
| 2018/0162013 A1* | 6/2018 | Fulop | B29C 48/02 |
| 2020/0086564 A1* | 3/2020 | Lewis | B29C 48/298 |
| 2020/0147873 A1* | 5/2020 | Lewis | B29C 64/118 |
| 2022/0306868 A1* | 9/2022 | Bui | C09D 183/08 |

OTHER PUBLICATIONS

French Preliminary Search Report and Written Opinion (with English Translation of Categories of Cited Documents) dated Aug. 30, 2018 in French Application No. 17 61727 filed on Dec. 6, 2017, 8 pages.

* cited by examiner

METHOD FOR IN SITU ADDITIVE MANUFACTURING OF A COATING ON A TURBOMACHINE CASING

BACKGROUND OF THE INVENTION

The present invention relates to the general field of manufacturing of parts of polymer, particularly thermosetting materials, of metallic, metal alloy or ceramic parts by additive manufacturing and it relates more particularly, but not exclusively, to the manufacture of abradable coatings having acoustic functionalities, particularly for fan casings.

The control of noise nuisances due to airplanes in the vicinity of airports has become a public health challenge. Ever more severe standards and regulations are imposed on airplane manufacturers and on airport managers. Consequently, constructing a silent airplane has become a powerful selling point over the years. At present, the noise generated by airplane motors is attenuated by localized reaction acoustic coatings which allow reducing the sound intensity of the engine over one or two octaves, based on the principle of Helmholtz resonators. These coatings appear conventionally in the form of composite panels consisting of a rigid plate associated with a honeycomb core covered with a perforated skin located at the nacelle or the upstream and downstream propagation conducts. However, in new engine generations (for example in turbofan engines), the zones available for acoustic coatings are caused to be substantially reduced, as in the UHBR (ultra-high bypass ratio) technology. Moreover, these casing zones of composite material are likely to have forming defects which it is appropriate to compensate with an additional machining operation prior to the installation of the coating.

It is therefore important to propose new methods and/or new materials (particularly porous materials) allowing eliminating or significantly reducing the noise level generated by airplane engines, particularly during the takeoff and landing phases, and over a larger frequency range than currently, including the low frequencies, while retaining the performance of the engine. That is the reason for which new noise reduction technologies are currently sought to reduce this nuisance, as well as new acoustic treatment surfaces, this with minimum impact on the other functionalities of the engine such as specific fuel consumption, which constitutes an important economic advantage.

Yet within airplane engines, the noise originating in the fan is one of the primary contributors to noise nuisances, favored by the increase in the bypass ratio which these new airplane generations seek.

Moreover, it is currently customary and advantageous to have recourse to additive manufacturing methods instead of traditional foundry, forging and mass machining methods, to easily and rapidly produce at reduced cost three-dimensional complex parts. The aeronautical field lends itself particularly well to the use of these methods. Among these can be cited for example the wire beam deposition method.

OBJECT AND SUMMARY OF THE INVENTION

The present invention aims to propose a method of forming a new abradable material, also allowing a significant reduction in the noise generated by airplane turbojets and particularly that generated by the fan-OGV assembly. One aim of the invention is also to compensate forming defects resulting from the composite nature of the substrate on which this abradable material is intended to be deposited.

To this end, an in situ deposition method by manufacturing a coating on a turbomachine casing is provided, consisting of depositing on an internal surface of a turbomachine casing a filament of an abradable material in a predefined deposition path in order to create a three-dimensional scaffold of filaments forming between them an ordered array of channels, the method being characterized by the following steps:

positioning a filamentary material deposition system along a longitudinal axis of said casing at a predetermined position and distance relative to said internal surface of said casing, depositing a first layer of said coating on the 360° of the circumference of said casing by a relative circumferential displacement between said casing and said filamentary material deposition system, carrying out a rotation of said filamentary material deposition system by a first predetermined angle and positioning said filamentary material deposition system along said longitudinal axis of said casing at a predetermined position and distance relative to said first layer of said coating, depositing, on a sector of said casing by a relative axial displacement between said casing and said filamentary material deposition system, a second layer of said coating on said first layer of said coating, carrying out a relative circumferential displacement between said casing and said filamentary material deposition system by a predetermined angular deviation corresponding to the first sector already covered during the deposition of said second coating layer, and repeating the step of depositing on said casing sector and the step of relative circumferential displacement by said predetermined angular deviation for the following sectors until the 360° of the circumference of said casing is covered, and after having carried out a rotation of said filamentary material deposition system by a second predetermined angle, repeating all the preceding steps, with the exception of the first, for the following layers until a desired coating thickness is obtained.

Thus a porous microstructure with regular and ordered porosity is obtained, which ensures high absorption of acoustic waves by visco-thermal dissipation within the channels.

Preferably, prior to the deposition of said first layer of said coating, a layer of a clearance compensation material is deposited on said turbomachine casing to obtain a deposition surface with known geometry.

Advantageously, the deposition of filamentary material is carried out by a plurality of ejection nozzles, the vertical positioning of each of said ejection nozzles being independently adjustable.

Depending on the embodiment considered, said step of rotation of said filamentary deposition system is carried out twice by successive 90° rotation, the first predetermined angle being equal to 90° or said step of rotation of said filamentary deposition system is carried out as many times as there exist different predetermined orientation directions of the filaments. More particularly, said step of rotation of said filamentary deposition system is carried out six times by successive 30° rotation, the first predetermined angle being equal to 30°.

Preferably, additional layers of said coating are added locally to take into account a non-axisymmetric geometry of said turbomachine casing.

Advantageously, the deposition of filamentary material is carried out by a plurality of ejection nozzles, the vertical positioning of each of said ejection nozzles being independently adjustable.

Preferably, said turbomachine casing is a fan casing of woven composite material.

The invention also relates to a filamentary material deposition system for implementing the aforementioned method and to an abradable turbomachine wall coating obtained from the aforementioned method.

BRIEF DESCRIPTION OF THE DRAWINGS

Other features and advantages of the present invention will be revealed by the detailed description given below, with reference to the following figures, free of any limiting character, and in which.

DETAILED DESCRIPTION OF THE INVENTION

Figure 1:
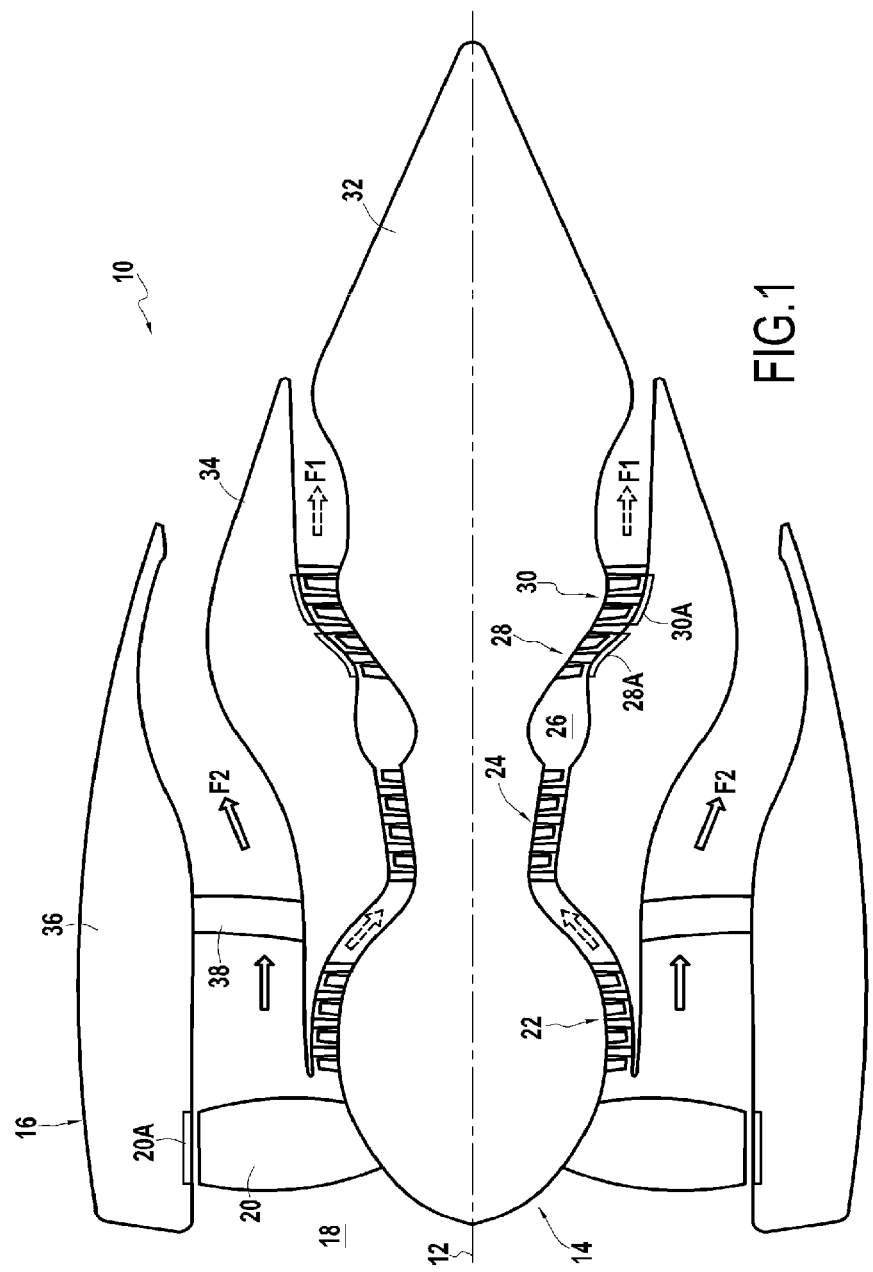
FIG. 1 illustrates schematically an aircraft turbomachine architecture in which is implemented the in situ coating manufacturing method according to the invention.

FIG. 1 shows very schematically an aircraft turbomachine architecture, in this case a double flow turbojet, in which is implemented the manufacturing process of an abradable material coating with acoustic properties of the invention.

Conventionally, a double flow turbojet 10 of this type has a longitudinal axis 12 and consists of a gas turbine engine 14 and of an annular nacelle 16 centered on the axis 12 and located concentrically around the engine.

From upstream to downstream, in the flow direction of a flow of air or of gas passing through the turbojet, the engine 14 comprises an air inlet 18, a fan 20, a low-pressure compressor 22, a high-pressure compressor 24, a combustion chamber 26, a high-pressure turbine 28 and a low-pressure turbine 30, each of these elements being located along the longitudinal axis 12. The ejection of the gases produced by the engine is carried out through a nozzle consisting of a central annular body 32 centered on the longitudinal axis 12, a primary annular cowl 34 surrounding the central body coaxially to delimit with it an annular flow channel of the primary flow F1, and a secondary annular cowl 36 surrounding the primary cowl coaxially to delimit with it an annular flow channel of the secondary flow F2, coaxial with the primary flow channel and in which are located straightening vanes 38 (in the exemplary embodiment illustrated, the nacelle 16 of the turbojet and the secondary cowl 36 of the nozzle are the same single part). The primary and secondary cowls integrate in particular the intermediate turbine casings 28A and 30A surrounding the movable blades of the turbine rotors and the fan casing 20A surrounding the movable blades of the fan rotor.

According to the invention, it is proposed to apply, by additive manufacturing, on the internal walls of the casings facing the movable rotor blades, a coating endowed with abradable and acoustic functionalities, and which appears in the form of a three-dimensional scaffold of filaments forming together an ordered array of channels. According to the configuration considered, interconnections between the channels can exist in a regular manner during the superposition of the different layers of the coating intended to generate these different channels. This wall is preferably a wall of a turbomachine, such as an airplane turbojet, mounted in the immediate periphery of movable blades, and more particularly the internal wall of the fan casing 20A of 3D-woven composite located at the periphery of the fan blades. However, a deposit on the turbine casing(s) 28A, 30A can also be considered, provided of course that the abradable material of the metallic or ceramic type then has properties suited to the very high temperature environment of the turbine.

The value of the abradable functionality is to make the rotor-casing assembly compatible with the deformations which the movable blades undergo in rotation when the latter are subjected to the sum of the aerodynamic and centrifugal forces.

What is meant by abradable material is the capacity of the material to break up (erode) during operation in contact with a facing part (low resistance to shear) and its resistance to ear following the impacts of particles or foreign bodies which it is forced to ingest during operation. A material of this type must also retain and favor good aerodynamic properties, have sufficient resistance to oxidation and corrosion and a thermal dilation coefficient of the same order as the layer or the substrate on which it is deposited, in the latter case the woven composite material forming the walls of the casing.

Figure 2:
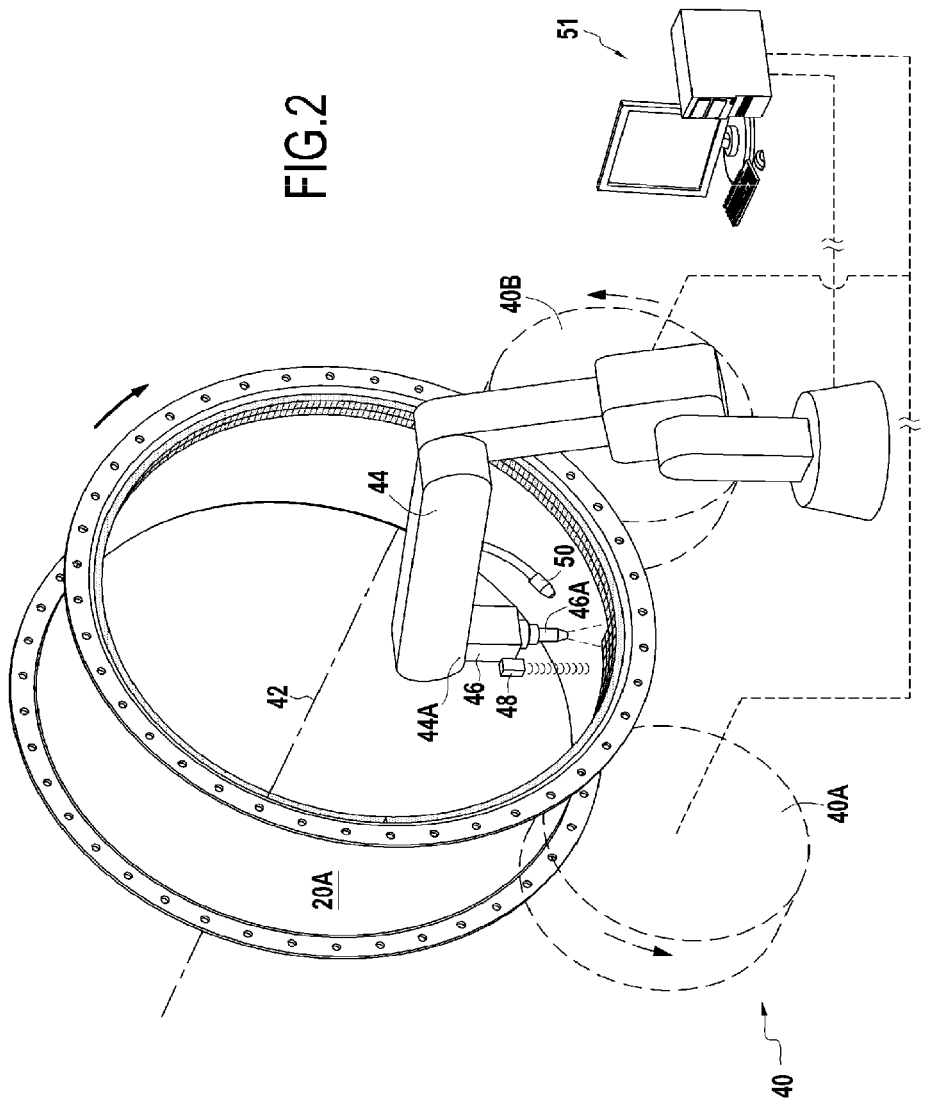
FIG. 2 is a schematic view of a first example of a device for the implementation of the method of the invention.

FIG. 2 illustrates a first example of a device allowing the production of a coating of this type with acoustic properties by continuous deposition of filaments of abradable material on an internal wall of a turbomachine such as a fan casing 20A.

This device includes a casing support 40 intended to position the fan casing 20A so that its longitudinal axis 42 is parallel to the ground, thus favoring the deposition of filamentary by gravity (downward vertical deposit of material) on any point of the internal wall of the casing. This support can for example consist of two synchronized drive rollers 40A, 40B to simultaneously drive the casing in rotation around its longitudinal axis, thus ensuring a degree of freedom in rotation along this longitudinal axis.

The device also includes a mechanical assembly 44 provided with several hinges and equipped, at a free end 44A, with a filamentary material deposition system 46 including at least one ejection nozzle 46A through which the abradable material is accurately ejected. Typically, a mechanical assembly of this type is constituted at least of one 3-axis machine or, as illustrated, by a robot having accurate "digital axes" (positioning on the order of 5 microns) allowing, via appropriate control software, controlling the printing along a deposition path defined by the user. Thanks to these equipment, it is therefore possible to guarantee accurate deposition of filaments in a predetermined three-dimensional space, by controlling the printing parameters such as the flow rate of the material, the position and displacement speed of the mechanical assembly.

More precisely, this mechanical assembly 44 has a degree of freedom in translation along the longitudinal axis of the casing so as to reach any point of its internal wall for depositing abradable material. It also has a degree of freedom in vertical translation, so that the distance relative to the deposition surface can be adjusted in real time. Moreover, this degree of freedom allows adapting the deposition system to variations of diameter which can be observed between different turbojet architectures. To accomplish this, a distance sensor 48 secured to or located in proximity to the ejection nozzle 46A is provided in order to measure the distances between this ejection nozzle and the casing or the abradable material. This sensor can also be used, via the use of appropriate known algorithms, to allow metrological control of the initial and final dimensional geometry which, in the particular case of a fan casing, is non-axisymmetric.

Optionally and depending on the nature of the material used, the device can also include a solidification module 50 to favor and accelerate the process of solidification of the abradable material deposited. This module can be formed from a light wave emission device (UV, infrared or other), by one or more fans blowing in the direction of the abradable material or by one or more resistance heaters or even by yet another similar heating system, even possibly by a refrigerating device depending on the nature of the material used, these different device being able to operate along or in combination with one another.

The monitoring and the control of all the constituents of the device are provided by a management unit 51, typically a microcontroller or a microcomputer, which manages the deposition of abradable material in connection with the rotation of the fan casing, the final dimensional tolerancing depending on the data obtained by the distance sensor 48 and, when it is present, the monitoring of the solidification via the module 50.

Figure 3:
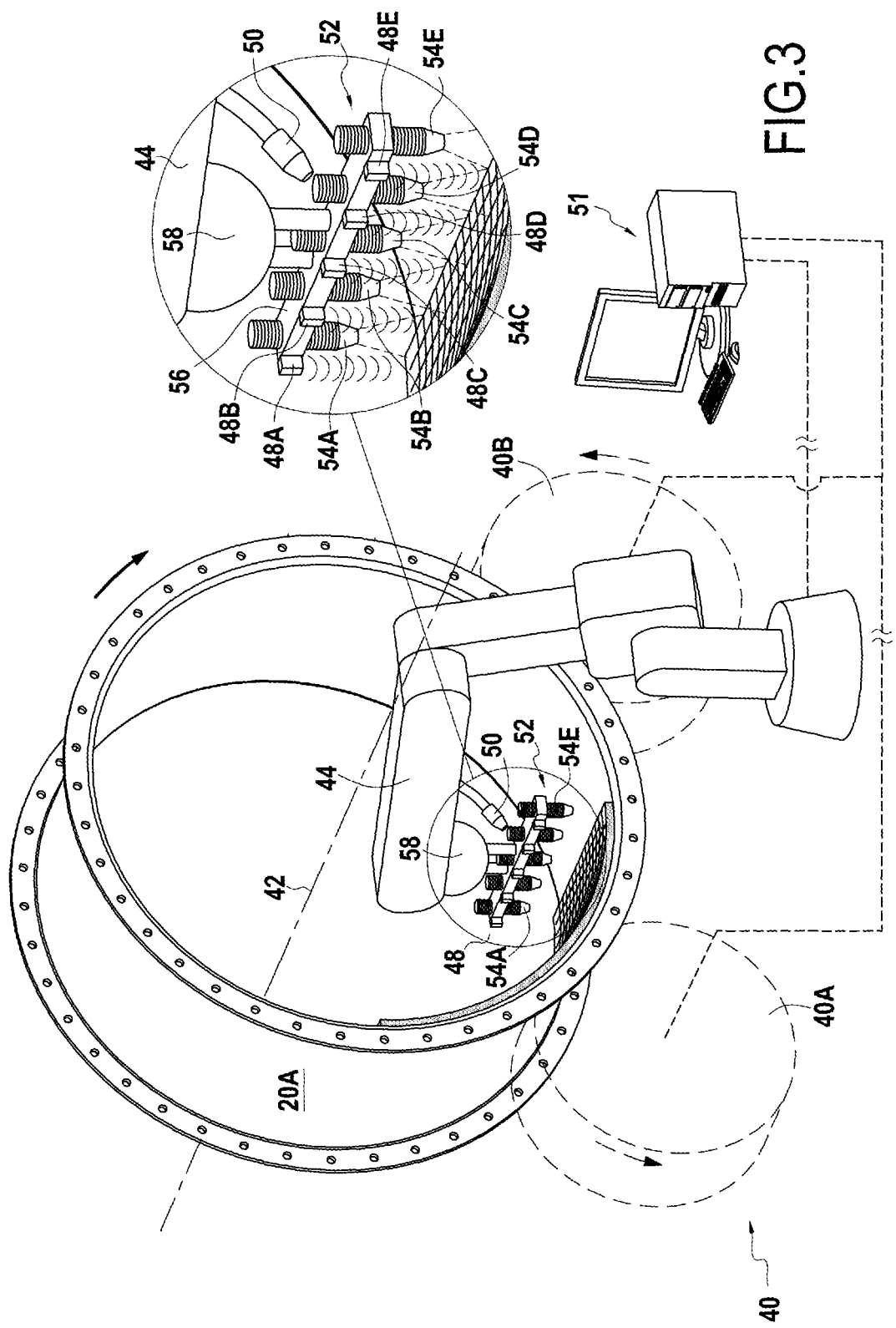
FIG. 3 is a schematic view of a second example of a device for the implementation of the method of the invention.

FIG. 3 illustrates a variant embodiment of the device (unchanged elements bear the same reference symbols), in which the single ejection nozzle is replaced by a multi-nozzle system 52 allowing accelerating the deposition of abradable material by a factor greater than the number of nozzles and including several ejection nozzles 54A-54E aligned on the axis of a rigid part 56 which supports them and in which the vertical positioning of each of these nozzles, measurable by an associated distance sensor 48A-48E, is independently adjustable in order to guarantee an optimal distance between each nozzle and the surface on which the filamentary material is deposited (taking into account the cylindrical shape of the fan casing). It will be noted that the single sensor 48 could, by means of post-treatment of the data gathered, also deduce this distance between each of the nozzles and the surface of the casing. Each nozzle is advantageously equipped with a circuit allowing regulating the pressure and the output temperature of the nozzle so as to control the geometries as well as the times and deposition cycles.

The nozzles are preferably removable and separable from the support part 56 so that it is possible to parametrize the number of nozzles and their geometry (size and cross section) depending on the coating to be implemented. They can also be adjustable in height depending on the angle that the filamentary material deposition system defines relative to the casing. In addition, each nozzle can be fed by different material sources, depending on the type of coating desired.

The support part 56 can have a pivot connection 58 relative to the mechanical assembly 44 which supports it. The axis of this pivot is oriented vertically, i.e. parallel to that of the nozzles. Thus, by applying rotation to a support part, it is possible to monitor the spacings between the material deposition points, regardless of the direction of relative displacement of the nozzles (axial or azimuthal) relative to the fan casing 20A.

Figure 4:
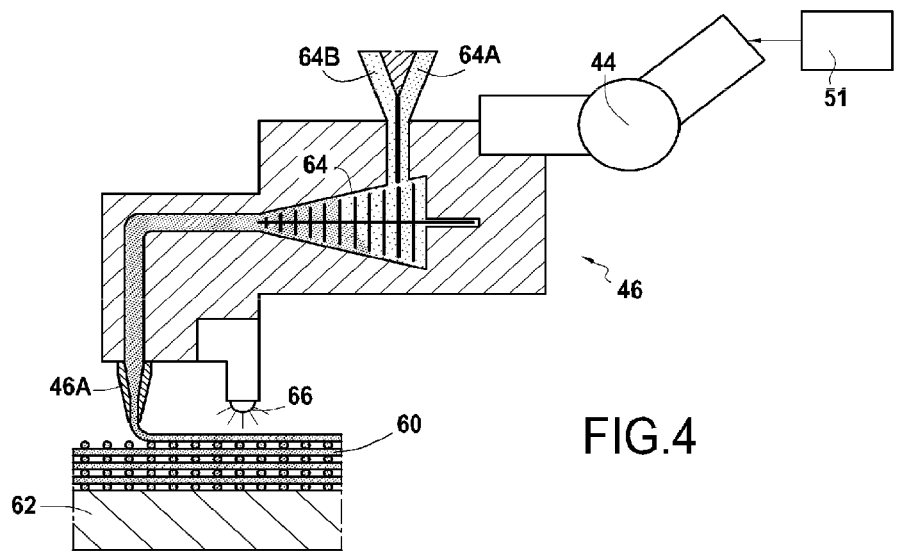
FIG. 4 illustrates a filamentary material deposition system used in the device of FIG. 2.

The filamentary material deposition system 46 is illustrated schematically in FIG. 4. This filamentary deposition system has as its object depositing, in connection with the aforementioned pressure and temperature control circuit internal to the system, an abradable material by extrusion via the ejection nozzle 46A with calibrated shape and dimensions, first on the substrate 62 then successively on the different superimposed layers created, until the desired thickness is obtained. The filamentary deposition system follows a deposition path controlled by the management unit 51 to which it is connected, ensuring the control of the filamentary deposition system and controlling at every point of the treated surface both the filamentary arrangement and the porosity of the medium necessary for guaranteeing the desired abradability.

The feeding of abradable material is ensured based on a conical extrusion screw 64 allowing the mixing of several components to form a thixotropic fluid having the appearance of a paste. The conical extrusion screw allows ensuring an adequate and homogeneous mixture of the components (throughout the deposition operation), to ultimately obtain a fluid material with high viscosity which will be deposited by the calibrated nozzle. During this operation, the generation of air bubbles, which form as many defects in the printed filament, must be avoided, and it is therefore necessary to push the material very progressively. It will be noted that the change in the constitution of the material deposited can be accomplished simply by a control of the different components introduced successively into the conical extrusion screw which includes at least two inlets 64A, 64B for the simultaneous introduction of two components. A heating lamp 66 mounted in proximity to the ejection nozzle 46A and operating as a solidification module can be used to stabilize the deposited material and avoiding creep during the deposition.

Figure 5:
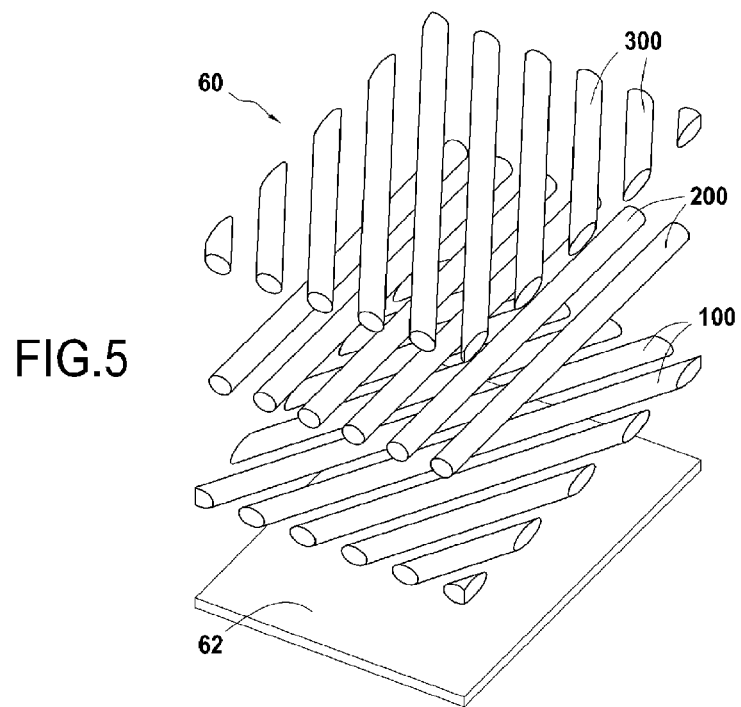
FIG. 5 is an exploded view of a three-dimensional scaffold of cylindrical filaments obtained by the system of FIG. 4, FIGS. 6A to 6D are examples of ordered arrays of channels obtained by the system of FIG. 4.

FIG. 5 illustrates in exploded perspective a small part of the three-dimensional scaffold 60 of filaments 100, 200, 300, advantageously cylindrical, of the abradable material allowing the production of the coating in the form of an ordered array of channels of a nature to confer acoustic properties to a wall 62 intended to receive this coating.

In fact, the objective is to print, in the structure of the abradable material, specific patterns having dimensioned porosities allow the passage or the dissipation of aerodynamic fluctuations (or their modification) and/or acoustic waves. These patterns can consist of perforations or grooving with dimensions less than 1.5 mm, also allowing improving the aerodynamic margins. But, advantageously, these patterns will consist of channels or micro-channels forming an ordered array as shown in the different configurations of FIGS. 6A, 6B, 6C et 6D.

Figure 6A:
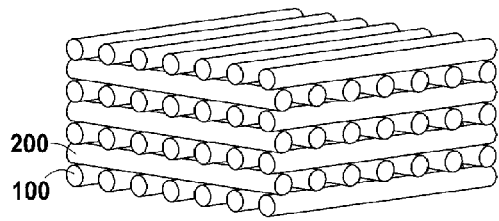

In FIG. 6A, the three-dimensional scaffold of filaments 100, 200 consists of superimposed layers in which the filaments of a given layer are oriented alternately at 0 or at 90° with no offset in the superimposition of filaments having the same direction.

Figure 6B:
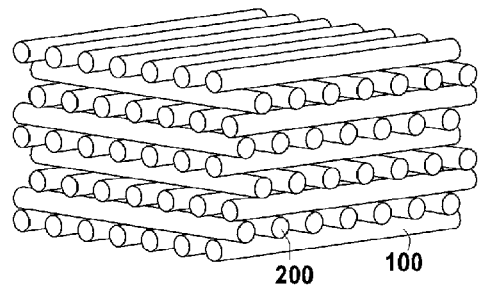

In FIG. 6B, the three-dimensional scaffold of filaments 100, 200 consists of superimposed layers in which the filaments of a given layer are oriented alternately at 0 or 90° and have an offset in the superimposition of filaments having the same direction.

Figure 6C:
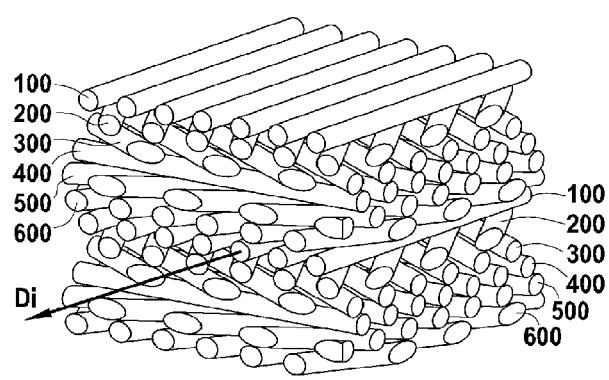

In FIG. 6C, the three-dimensional scaffold of filaments 100, 200, 300, 400, 500, 600 consists of superimposed layers having orientation directions of the filaments Di offset by the same angular deviation, typically 30°, at least layer i (i comprised between 1 and 6).

Figure 6D:
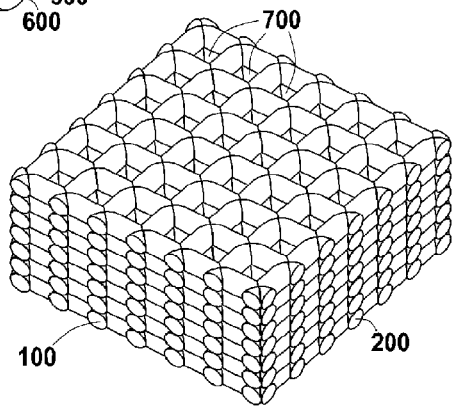

And in FIG. 6D, the three-dimensional scaffold of filaments 100, 200 consists of superimposed layers having, for each of the layers, both a filament orientation of 0° and a filament orientation of 90°, so as to form vertical perforations 700 with square cross sections between the filaments.

Printing on a sector of the casing with these different array configurations has shown the feasibility of a filamentary deposition of abradable material of this type according to the aforementioned additive manufacturing method. Tests of mechanical behavior in compression and bending have also been carried out, as well as samples intended for a low-energy impact test or to characterizing the acoustic impedance at normal incidence. In particular, a transmission of acoustic energy through the scaffold and an absorption of a part of this acoustic energy by modification of the aeroacoustic sources or absorption of the propagating sound waves has been observed.

Figure 7:
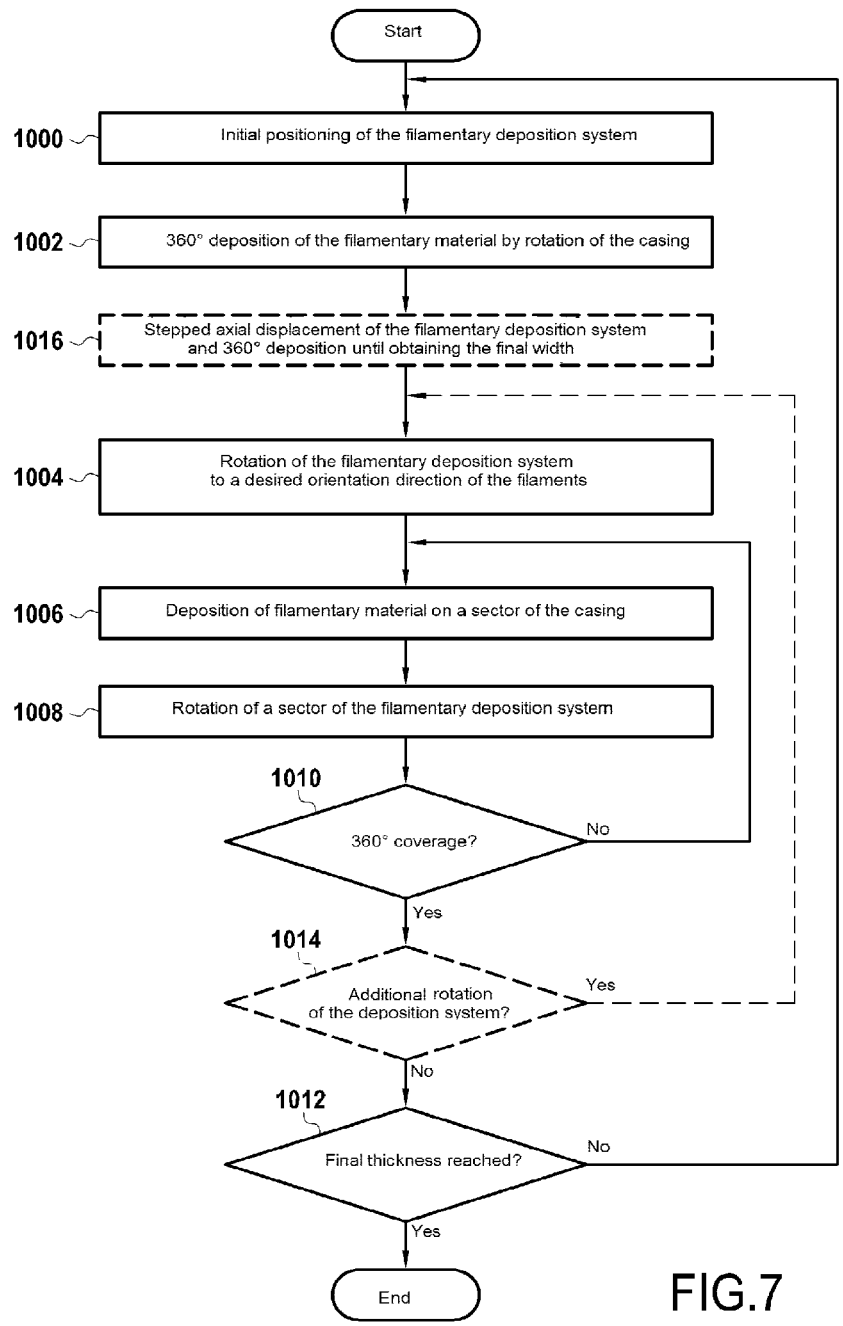
FIG. 7 shows the different steps of the in situ coating manufacturing method according to the invention.

FIG. 7 shows the different steps of the additive manufacturing method for a coating on a fan casing for a structure with an orthogonal mesh like that illustrated in FIG. 6A, obtained with the device of FIG. 3, the fan casing 20A being positioned on its retaining support 40 movable in rotation.

In a first step 1000, the filamentary deposition system 46 is positioned by a series of vertical and axial translations above the material deposition zone, on the axis 42 of the fan casing and at a predetermined distance relative to the internal surface of the fan casing, and the multi-nozzle support is oriented parallel to the axis 42 (called the 0° position). In a subsequent step 1002, the fan casing is placed in rotation, then causing a deposition of material in planes perpendicular to the axis 42, over the 360° of its circumference, with as many filaments of matter as the number of nozzles, the vertical position of each nozzle being controlled individually. In step 1004, the casing having returned to its initial position, the rotation of the fan casing ends and the support part of the nozzles 56 then carries out a 90° rotation corresponding to the orientation direction of the filaments of the second coating layer. In a step 1006, the deposition of a first row of filaments of material on a first sector of the casing proceeds by axial displacement of the filamentary deposition system 46, so as to carry out deposition at 90° relative to the filaments of material previously deposited circumferentially around the axis 42. In the subsequent step 1008, the fan casing carries out a rotation corresponding to a predetermined angular deviation equal to the first sector already covered, then a return is made to step 1006 to carry out depositions on the following sectors until 360° of the circumference of the casing is covered (test, step 1010). Steps 1000 to 1008 are then repeated until the desired thickness of material is obtained (final test, step 1012).

It will be noted that, if in the aforementioned description, the circumferential deposition is carried out due to the rotation of the casing, it is clearly understood that this deposition can also be carried out by rotation of the filamentary deposition system. Likewise, if the sectoral deposition is carried out due to the axial displacement of the filamentary deposition system, it is clearly understood that this deposition can also be carried out by axial displacement of the casing. What is important in fact is that there exists a relative displacement between the casing and the filamentary deposition system.

It will also be noted that, if the method has been described with reference to the multi-nozzle support, it is obvious that it is also applicable to the single-nozzle configuration of FIG. 2, provided that, after each 360° rotation, an axial displacement of the filamentary deposition system by a predetermined pitch (optional step 1016) is provided so that the entire width of the casing is covered, pitch by pitch, once all the 360° rotations are completed.

In the coating manufacturing configuration having the structure with an inclined mesh with regular angular deviations (every 30°) like that illustrated in 6C, the step 1004 of rotation is no longer 90° but only 30°, so as to carry out in the following step 1006 the deposition of the layer 200 at 30° and no longer at 90°. And once this second layer 200 is deposited, an additional rotation of 30°, or 60° is carried out following the test of step 1014 to deposit the third layer 300 instead of a return to the initial position at 0° which is accomplished in this configuration only once the layer 600 corresponding to the last orientation direction of the filaments is deposited.

It is appropriate to note that an additional layer can be added prior to the elaboration of this three-dimensional scaffold. In fact, the fan casing is a 3D-woven composite casing, the three-dimensional geometry of which generally has deviations (forming defects) relative to the calculated ideal surface, due in particular to the tendency to form lobes linked to the weaving method used (conventionally of the poly-flex type). Yet taking up these defects currently involves complex and costly operations. It is therefore possible, with the device, to deposit a clearance compensating material (resin or other) in order to obtain a known geometry. The value of this prior step is to return to a controlled, accurately defined deposition surface, satisfying forming constraints, to ensure good aerodynamic clearance of the engine zone.

It is also appropriate to note that additional layers can be added locally in order to ensure the axial symmetry of the abradable surface. In fact, fan casings often have a non-axisymmetric geometry.

The abradable material extruded by the calibrated nozzle(s) is advantageously a thermosetting material with high viscosity which is free of solvent, the evaporation of which generates, as is known, strong shrinkage. This material is preferably a with slow polymerization kinetics with stable filamentary flow appearing in the form of a thixotropic mixture, which therefore has the advantage of much smaller shrinkage between printing on the substrate (just after extrusion of the material) and the final structure (once heated and with polymerization complete).

One example of an abradable material used in the context of the method of the invention is a material appearing in paste form and consisting of three components, namely a polymer base, for example an epoxy resin (with the appearance of a blue modeling paste), a cross-linking agent or accelerator (with the appearance of a white modeling paste) and a translucent petroleum jelly (Vaseline™ for example). The accelerator/base components are distributed according to a weight ratio of base to accelerator comprised between 1:1 and 2:1 and the petroleum jelly is present between 5 and 15% by weight of the total weight of the material. The base can also include hollow glass microspheres of a predetermined diameter to ensure the desired porosity while still allowing increasing the mechanical performance of the printed scaffold. The value of the introduction of petroleum jelly resides in the reduction of viscosity of the resin as well as the reaction kinetics of the abradable, which makes its viscosity more stable during the printing time and thus facilitates the flow of the material. (Viscosity is directly linked to the necessary extrusion pressure to ensure adequate extrusion speed for retaining the quality of the printing).

By way of an example, a ratio of this type of 2:1 gives an abradable material comprising 0.7 g of accelerator and 1.4 g of base, to which is it appropriate to add 0.2 g of petroleum jelly.

Thus, the present invention allows rapid and stable printing, allowing effective reproduction of controlled high-performance acoustic structures (roughness, appearance, opening ratio) having a small filament size (<250 microns in diameter) and low weight (improved porosity ratio >70%) particularly advantageous considering the strong stresses encountered in aeronautics.

The invention claimed is:

1. An in situ deposition method of a coating by additive manufacturing on a turbomachine casing, the method comprising:

depositing on an internal surface of said turbomachine casing a filament of a size of at most 250 microns of diameter of an abradable material in a predefined deposition path in order to create a three-dimensional scaffold of filaments having a coating thickness and forming between the filaments an ordered array of channels by positioning a filamentary material deposition system along a longitudinal axis of said casing at a predetermined position and distance relative to said internal surface of said casing, the filamentary material deposition system including an ejection nozzle fed by a conical extrusion screw which mixes components of the coating of the abradable material to obtain a thixotropic fluid, depositing a first layer of said coating by depositing the thixotropic fluid using the ejection nozzle of the filamentary material deposition system on 360° of the circumference of said casing by a circumferential displacement between said casing and said filamentary material deposition system, carrying out a rotation of said filamentary material deposition system by a first predetermined angle and positioning said filamentary material deposition system along said longitudinal axis of said casing at a predetermined position and distance relative to said first layer of said coating, depositing, on a first sector of said casing by an axial displacement between said casing and said filamentary material deposition system, a second layer of said coating on said first layer of said coating by the depositing the thixotropic fluid using the ejection nozzle of the filamentary material deposition system, carrying out a circumferential displacement between said casing and said filamentary material deposition system by a predetermined angular deviation corresponding to the first sector already covered during the deposition of said second layer of said coating, repeating the step of depositing on said first sector of said casing by the depositing the thixotropic fluid using the ejection nozzle of the filamentary material deposition system and the step of carrying out the circumferential displacement by said predetermined angular deviation for the following sectors until 360° of the circumference of said casing are covered, and after having carried out a rotation of said filamentary material deposition system by a second predetermined angle, repeating the preceding steps of depositing by the depositing the thixotropic fluid using the ejection nozzle of the filamentary material deposition system and carrying out the circumferential displacement for further layers of said coating until the coating thickness is obtained.

2. The in situ deposition method of a coating by additive manufacturing according to claim 1, wherein, prior to the deposition of said first layer of said coating, a layer of a material is deposited on said turbomachine casing having a non-axisymmetric geometry to obtain a deposition surface with an axisymmetric geometry.

3. The in situ deposition method of a coating by additive manufacturing according to claim 1, wherein said step of rotation of said filamentary deposition system is carried out twice by successive 90° rotations, the first predetermined angle being equal to 90°.

4. The in situ deposition method of a coating by additive manufacturing according to claim 1, wherein said step of rotation of said filamentary deposition system is carried out as many times as there exists different predetermined orientation directions of the filaments.

5. The in situ deposition method of a coating by additive manufacturing according to claim 4, wherein said step of rotation of said filamentary deposition system is carried out six times by successive 30° rotation, the first predetermined angle being equal to 30°.

6. The in situ deposition method of a coating by additive manufacturing according to claim 1, wherein additional layers of said coating are added locally to overcome a non-axisymmetric geometry of said turbomachine casing.

7. The in situ deposition method of a coating by additive manufacturing according to claim 1, wherein the deposition of filamentary material is carried out by a plurality of ejection nozzles wherein a vertical positioning of each of said ejection nozzles is independently adjustable.

8. The in situ deposition method of a coating by additive manufacturing according to claim 1, wherein said turbomachine casing is a fan casing of woven composite material.

9. A filamentary material deposition system for the implementation of the in situ deposition method of a coating by additive manufacturing according to claim 1.

10. An abradable turbomachine wall coating obtained from the in situ deposition method of a coating by additive manufacturing according to claim 1.

11. The in situ deposition method of a coating by additive manufacturing according to claim 1, wherein a distance sensor is provided to measure distances between the ejection nozzle and the casing or the abradable material.

12. The in situ deposition method of a coating by additive manufacturing according to claim 1, wherein a heating lamp is mounted in proximity to the ejection module and stabilizes the deposited thixotropic fluid.

* * * * *